Figure 1:
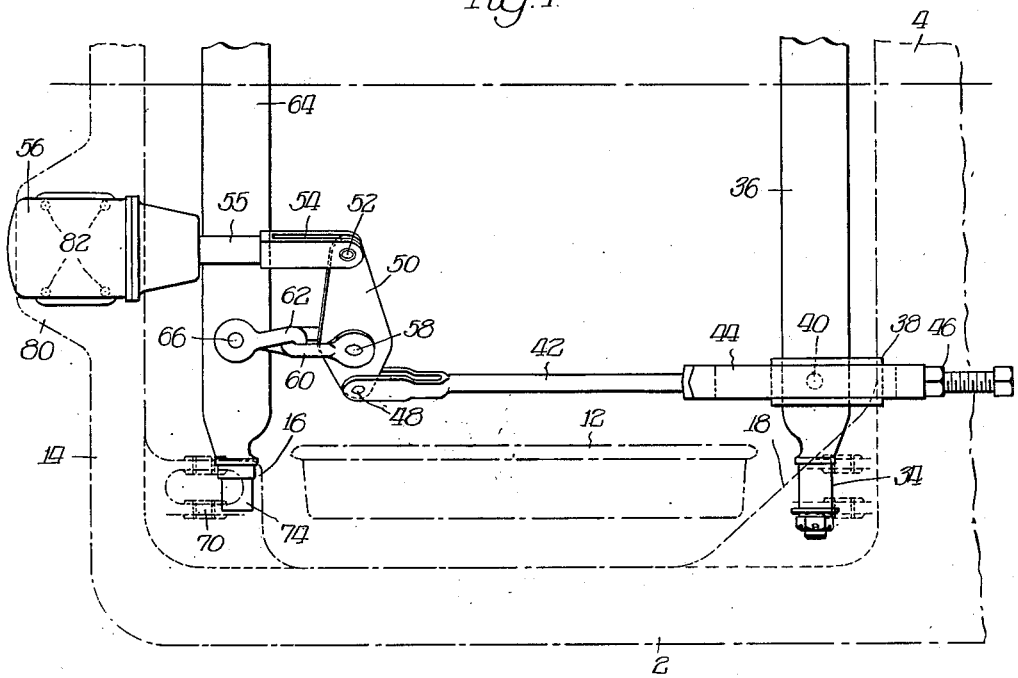

June 15, 1937.  W. H. BASELT  2,084,072

CLASP BRAKE

Filed Sept. 21, 1936

Inventor:
Walter H. Baselt,
By Orin O. B. Garner Atty.

Patented June 15, 1937

2,084,072

UNITED STATES PATENT OFFICE 2,084,072

CLASP BRAKE

Walter H. Baselt, Chicago, Ill., assignor to American Steel Foundries, Chicago, Ill., a corporation of New Jersey Application September 21, 1936, Serial No. 101,703

22 Claims. (Cl. 188—56)

My invention relates to brake rigging for a railway car truck and more particularly to a type of brake rigging wherein brake heads and brake shoes are supported on opposite sides of the wheels and commonly known as clasp brakes.

An object of my invention is to provide a clasp brake arrangement for a railway car truck which will be extremely economical of space and will be particularly suitable for recent designs of high-speed trains having a low center of gravity.

Another object of my invention is to provide such a type of rigging wherein a minimum number of parts may be used and wherein the power will be applied as directly as possible through the operating parts.

A still further object of my invention is to provide a type of clasp brake rigging wherein a plurality of power means or brake cylinders are mounted on each end rail of a car truck for operation of the rigging mounted at the respective ends of the truck, said brake cylinders being designed to operate in unison.

With these and various other objects in view, my invention may consist of certain novel features of construction and operation as will be more fully described and particularly pointed out in the specification, drawing and claims appended hereto.

In the drawing which illustrates an embodiment of my invention and wherein like reference characters are used to designate like parts—

Figure 2:
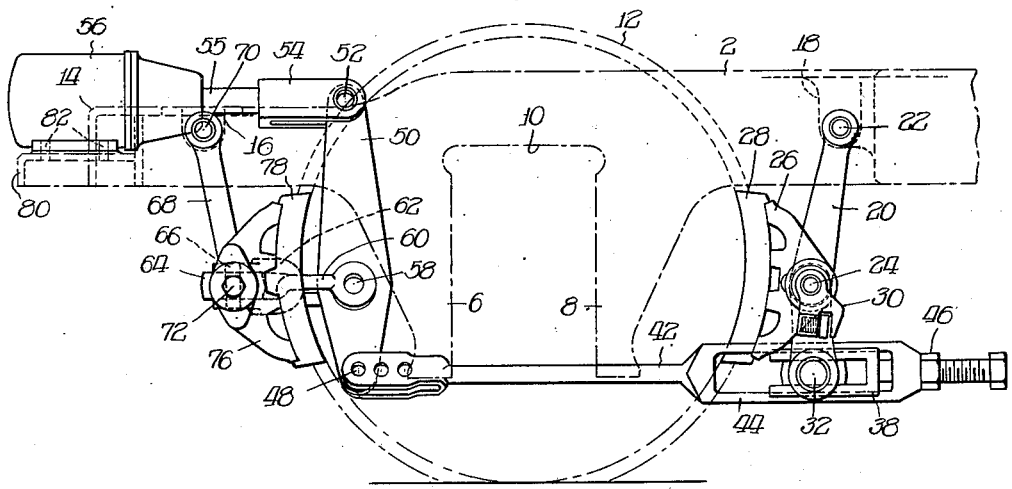

Figure 1 is a top plan view of a four wheel railway car truck embodying my invention, only one end of the truck being shown and only one side inasmuch as the construction is the same on opposite sides and at the respective ends of the truck; and Figure 2 is a side elevation of the truck and brake construction shown in Figure 1.

Describing the structure in more detail, the truck frame comprises a side frame 2 at each side of the truck, said side frames being joined by the usual load carrying members or spaced transoms 4 between which may be supported in the usual manner the bolster (not shown). Adjacent each end of each side frame the pedestals 6 and 8 form the jaw opening 10 for association with a journal box cooperating in the usual manner with the journal portion (not shown) of the wheel and axle assembly 12. End rails 14 are formed as an integral part of the frame structure, the junctures between said end rails and said side frames being reinforced by the gusset and bracket structure 16 and, likewise, the junctures of the load carrying members 4 with the side frame being reinforced by the gusset and bracket structure 18.

The brake rigging comprises the hanger lever 20 (Figure 2, right) supporting the rigging inwardly of the wheel and axle assembly 12, said hanger lever being pivotally supported at its upper end as at 22 from the bracket 18, said hanger lever having pivotally connected intermediate its ends as at 24 the brake head 26 and the associated brake shoe 28 disposed for cooperation with the adjacent wheel, the brake head being maintained in proper position as by the balance means 30. The lower end of the hanger lever 20 is pivotally connected as at 32 to the trunnion end 34 of the brake beam 36. Adjacent each end, the beam 36 is provided with the channeled guide means 38 secured to the beam as by rivet means 40 and providing a slidable connection between the beam 36 and the pull rod 42, said pull rod having the slotted end 44 within which the beam is received, the connection therewith being made adjustable as by means of the slack adjuster 46. The opposite end of the pull rod 42 is pivotally and adjustably connected as at 48 to the lower end of the cylinder lever 50, the upper end of the cylinder lever being pivotally connected as at 52 to the jaw end 54 of the piston 55 associated with the brake cylinder 56. Intermediate the ends of the cylinder lever 50 as at 58 is pivotally connected the clevis means 60, the opposite end of said clevis means being connected to the yoke fulcrum means 62 which is secured to the beam 64 adjacent an end thereof as by the rivets 66. The brake beams outwardly of the wheels are supported as by means of hangers 68 having their upper ends pivotally supported as at 70 from the bracket 16, the lower end of the hanger 68 being pivotally connected as at 72 to the trunnion end 74 of the brake beam 64. Likewise, pivotally supported on said trunnion end 74 is the brake head 76 with its associated brake shoe 78 disposed to cooperate with the opposite periphery of the before-mentioned wheel.

Widened portions 80 are integrally formed on each end rail intermediate the respective ends thereof and the longitudinal center line of the truck, upon which may be supported as by rivets 82 brake cylinders 56.

In operation, actuation of the power means or brake cylinder 56 causes the piston 55 to move to the right, thus causing the live cylinder lever 50 to rotate in a clockwise direction about the pivot 58 intermediate its ends and causing the pull rod 42 to move to the left, thus rotating the hanger lever 20 in a clockwise direction about its point of support 22 until the brake shoe 28 is brought into engagement with the periphery of the adjacent wheel. Continued actuation causes the live cylinder lever 50 to rotate in a clockwise direction about the pivot 48 at its lower end, thus moving the brake beam 64 to the right and bringing the brake shoe 78 into engagement with the opposite periphery of said wheel.

It will be understood of course that the cylinder 56 operates in conjunction with a similar cylinder at the opposite side of the truck. Thus, a pair of cylinders operates the rigging associated with the single wheel and axle assembly at each end of the truck.

Release of the power means causes the various parts to move in the reverse directions until they have assumed their normal inoperative position.

It is to be understood that I do not wish to be limited by the exact embodiment of the device shown which is merely by way of illustration and not limitation as various and other forms of the device will of course be apparent to those skilled in the art without departing from the spirit of the invention or the scope of the claims.

I claim:

1. In a railway car truck the combination of a truck frame having an end rail, a plurality of power means mounted on said end rail, a wheel and axle assembly, hanger levers supporting brake heads and a brake beam inwardly of said assembly, hangers supporting brake heads and a brake beam outwardly of said assembly, guide means mounted on said first mentioned beam adjacent its opposite ends, fulcrum means secured to said last mentioned beam adjacent its opposite ends, live levers having their upper ends connected respectively to said power means, pull rods having their outer ends connected respectively to lower ends of said live levers and their inner ends slidably connected respectively to said guide means, and clevis means connecting said fulcrum means to points intermediate the ends of said live levers respectively.

2. In a four wheel railway car truck the combination of a truck frame having an end rail, a plurality of power means mounted on said end rail, a wheel and axle assembly, hanger levers supporting a brake beam inwardly of said assembly, said beam having guide means secured thereon adjacent its opposite ends, hangers supporting a brake beam outwardly of said assembly, said beam having fulcrums adjacent its opposite ends, live levers having their upper ends connected respectively to said power means, pull rods connecting the lower ends of said live levers respectively to said guide means, and clevises connecting said fulcrums to points intermediate the ends of said live levers.

3. In brake rigging for a four wheel railway car truck the combination of a truck frame having an end rail, power means mounted on said end rail on opposite sides of the longitudinal center line of said truck, a wheel and axle assembly, a brake beam supported inwardly of said assembly, a brake beam supported outwardly of said assembly, live levers having their upper ends connected respectively to said power means and points intermediate their ends connected respectively to points adjacent the ends of said last mentioned beam, and pull rods pivotally connected at their outer ends respectively to the lower ends of said live levers and slidably and adjustably connected at their opposite ends to said first mentioned beam.

4. In brake rigging for a four wheel railway car truck the combination of a truck frame having an end rail, power means mounted on said end rail on opposite sides of the longitudinal center line of said truck, a wheel and axle assembly, a brake beam supported inwardly of said assembly, said brake beam having guide means secured adjacent its opposite ends, a brake beam supported outwardly of said assembly, said beam having fulcrums adjacent its opposite ends, and a pair of live levers having their upper ends connected respectively to said power means and points intermediate their ends connected respectively to said fulcrums, and pull rods connecting the lower ends of said live levers respectively to said guide means.

5. In brake rigging for a four wheel railway car truck the combination of a truck frame having an end rail, power means mounted on said end rail adjacent its opposite ends, a wheel and axle assembly, hanger levers supporting a beam inwardly of said assembly, brake heads supported on said hanger levers intermediate the ends thereof, hangers supporting a beam outwardly of said assembly, live levers having their upper ends connected respectively to said power means and their lower ends slidably and adjustably connected to said first mentioned beam adjacent its respective ends, and operative connections between points intermediate the ends of said live levers respectively and points adjacent the opposite ends of said last mentioned beam.

6. In a four wheel railway car truck the combination of a truck frame having end rails, power means mounted on said end rails, wheel and axle assemblies, hanger levers supporting brake heads and brake beams intermediate the wheels, hangers supporting brake beams outwardly of the wheels, live levers having their upper ends connected respectively to said power means and connected intermediate their ends to said last mentioned beams, and pull rods connecting the lower ends of said levers to points adjacent the ends of said first mentioned beams, the connections at the outer ends of said pull rods being pivotal and adjustable and the connection at the inner ends of said pull rods being adjustable.

7. In brake rigging for a four wheel railway car truck the combination of a truck frame having end rails, a plurality of power means mounted on each of said end rails, wheel and axle assemblies, hanger levers supporting brake heads and brake beams intermediate the wheels, hangers supporting brake beams outwardly of the wheels, pairs of live truck levers having their upper ends connected respectively to said power means and their lower ends adjustably connected respectively to the opposite ends of the beams intermediate the wheels, and operative connections between points intermediate the ends of said live levers respectively and points adjacent the ends of the beams outwardly of said wheels.

8. In a four wheel railway car truck the combination of a truck frame having an end rail, power means mounted on said end rail, a wheel and axle assembly, a hanger lever supporting a brake beam inwardly of said assembly, a brake head and brake shoe pivotally supported on said hanger lever intermediate its ends for cooperation with an adjacent wheel, a hanger supporting a brake beam outwardly of said assembly, a brake head and brake shoe pivotally supported on said last mentioned beam for cooperation with the opposite side of said wheel, and a live lever having its upper end connected to said power means, said live lever being connected at a point intermediate its ends to said last mentioned beam adjacent an end thereof and having its lower end adjustably connected to said first mentioned beam adjacent an end thereof.

9. In brake rigging for a railway car truck the combination of a truck frame having an end rail, a plurality of power means mounted on said end rail, a wheel and axle assembly, hangers supporting a brake beam outwardly of said assembly, hanger levers supporting a brake beam inwardly of said assembly, cylinder levers having their upper ends connected respectively to said power means and points intermediate their ends connected to said first mentioned beam adjacent its opposite ends, and pull rods having their outer ends connected respectively to the lower ends of said cylinder levers and their inner ends connected adjacent the opposite ends of said last mentioned beam.

10. In a four wheel railway car truck the combination of a truck frame having an end rail, a plurality of power means mounted on said end rail, a wheel and axle assembly, hanger levers supporting a brake beam inwardly of said assembly, brake heads and brake shoes supported on said hanger levers intermediate the ends thereof, hangers supporting a brake beam outwardly of said assembly, brake heads and brake shoes pivotally mounted on the ends of said last mentioned beam, fulcrum means mounted on said last mentioned beam adjacent its opposite ends, live levers having their upper ends connected respectively to said power means and their lower ends operatively connected respectively to said first mentioned beam, and clevis means connecting to each of said fulcrum means and to one of said live levers.

11. In a four wheel railway car truck the combination of a truck frame having an integrally formed end rail and an integrally formed transverse load carrying member, a wheel and axle assembly, power means mounted on said end rail, hangers hung from said frame adjacent the opposite ends of said end rail and supporting a brake beam, hanger levers hung from said frame adjacent the opposite ends of said load carrying member and supporting a brake beam, live levers having their upper ends connected respectively to said power means and their lower ends connected to said last mentioned beam, and operative connections between said live levers and points adjacent the opposite ends of said first mentioned beam.

12. In a four wheel railway car truck the combination of a truck frame having end rails, power means mounted on said end rails, wheel and axle assemblies, hanger levers supporting brake heads and brake beams intermediate the wheels, hangers supporting brake beams outwardly of the wheels, live levers having their upper ends connected to said power means and connected intermediate their ends to said last mentioned beams, and pull rods connecting the lower ends of said levers respectively to points adjacent the ends of said first mentioned beams, said pull rods having slidable connections with said first mentioned beams and adjustable connections with said levers.

13. In brake rigging for a four wheel railway car truck the combination of a truck frame having an end rail, power means mounted on said end rail on opposite sides of the longitudinal center line of said truck, a wheel and axle assembly, live levers having their upper ends connected respectively to said power means and their lower ends pivotally and adjustably connected by pull rods to a beam inwardly of said assembly adjacent its opposite ends, and clevis means secured to said live levers intermediate their ends, said clevis means being connected respectively to a beam outwardly of said assembly adjacent its opposite ends.

14. In brake rigging for a railway car truck the combination of a truck frame having an end rail, spaced power means mounted on said end rail, a wheel and axle assembly, brake beams supported on opposite sides of said assembly, live levers having their upper ends connected respectively to said power means and their lower ends pivotally and adjustably connected to pull rods, said pull rods having their opposite ends adjustably connected to the beam inwardly of said assembly adjacent its opposite ends, and connections between points intermediate the ends of said respective live levers and fulcrum means adjacent the opposite ends of the beam outwardly of said assembly.

15. In brake rigging for a railway car truck the combination of a truck frame having an end rail, spaced power means mounted on said end rail, a wheel and axle assembly, brake beams supported on opposite sides of said assembly, live levers having their upper ends connected respectively to said power means and their lower ends connected to the beam inwardly of said assembly adjacent its respective ends, fulcrum means secured to the opposite ends of the beam outwardly of said assembly, and operative connections respectively between said fulcrum means and points intermediate the ends of said live levers.

16. In a four wheel railway car truck the combination of a truck frame comprising an end rail, a plurality of power means mounted on said end rail, a wheel and axle assembly, hanger levers supporting a brake beam inwardly of said assembly, hangers supporting a brake beam outwardly of said assembly, live levers having their upper ends connected respectively to said power means and their lower ends operatively connected respectively to said first mentioned beam adjacent its opposite ends, said levers having operative connections respectively with said last mentioned beam adjacent its opposite ends.

17. In a four wheel railway car truck the combination of a truck frame having end rails, power means mounted on said end rails, wheel and axle assemblies, hanger levers supporting brake heads and brake beams intermediate the wheels, hangers supporting brake beams outwardly of the wheels, live levers having their upper ends connected to said power means and connected intermediate their ends to said last mentioned beams, and pull rods connecting the lower ends of said levers respectively to points adjacent the ends of said first mentioned beams.

18. In brake rigging for a railway car truck the combination of a truck frame having an end rail, a wheel and axle assembly, power means supported on said end rail, brake beams supported on opposite sides of said assembly, a live lever having its upper end connected to said power means and its lower end connected to said beam inwardly of said assembly, and an operative connection between said other beam and a point intermediate the ends of said lever.

19. In brake rigging for a railway car truck the combination of a truck frame having an end rail, a wheel and axle assembly, power means on said end rail, a brake beam supported inwardly of said assembly, a brake beam supported outwardly of said assembly, a live lever having its upper end connected to said power means and a point intermediate its ends connected to said last mentioned beam, and a pull rod connecting the lower end of said lever to said first mentioned beam.

20. In brake rigging for a railway car truck the combination of a truck frame having an end rail, a wheel and axle assembly, power means supported on said end rail, brake beams supported on opposite sides of said assembly, a live lever having its upper end connected to said power means and its lower end slidably and adjustably connected to said beam inwardly of said assembly, and an operative connection between said other beam and a point intermediate the ends of said lever.

21. In brake rigging for a railway car truck the combination of a truck frame having a transverse member, a wheel and axle assembly at one end of said truck, power means on said transverse member, a brake beam supported at one side of said assembly, a brake beam supported at the opposite side of said assembly, a live lever having its upper end connected to said power means and a point intermediate its ends connected to said last mentioned beam, hanger levers supporting said first mentioned beam, and a pull rod directly connected between the lower end of said lever and said first mentioned beam.

22. In brake rigging for a railway car truck the combination of a truck frame having a transverse member, a wheel and axle assembly, power means on said transverse member, brake beams supported on opposite sides of said assembly, a live lever having its upper end connected to said power means and its lower end adjustably connected to one of said beams through the medium of a pull rod, hanger levers supporting said last mentioned beam, and an operative connection between the other of said beams and a point intermediate the ends of said lever.

WALTER H. BASELT.